(12) United States Patent
Yamamura et al.

(10) Patent No.: US 6,290,233 B1
(45) Date of Patent: Sep. 18, 2001

(54) SEALING APPARATUS

(76) Inventors: Akira Yamamura, Sumitomo Irifune Buluding 1309, 2-1-1, Irifune Chiuou-ku, Tokyo, 104-0042; Hirohisa Ishizaki, 3-30-23 Kitasakae, Urayasu-city, Chiba, 279-0002; Heiichi Unozawa, 3599 Kawabe Nosaka-town, Chiba, all of (JP)

( * ) Notice: Subject to any disclaimer, the term of this patent is extended or adjusted under 35 U.S.C. 154(b) by 0 days.

(21) Appl. No.: 09/397,893

(22) Filed: Sep. 17, 1999

(30) Foreign Application Priority Data

Jan. 25, 1999 (JP) .................................................. 11-015712

(51) Int. Cl.[7] ...................................................... F16J 15/53
(52) U.S. Cl. ................................................................ 277/410
(58) Field of Search ................................................ 277/410

(56) References Cited

U.S. PATENT DOCUMENTS

| 2,883,212 | * | 4/1959 | Laser ..................................... 277/410 |
| 4,200,296 | | 4/1980 | Stahl et al. . |
| 4,304,411 | | 12/1981 | Wilcock et al. . |
| 4,335,885 | | 6/1982 | Heshmat . |
| 4,444,398 | * | 4/1984 | Black, Jr. et al. ..................... 277/410 |
| 4,455,026 | | 6/1984 | Pinkus et al. . |
| 4,526,381 | * | 7/1985 | Ezekiel ................................. 277/410 |
| 4,527,802 | | 7/1985 | Wilcock et al. . |
| 4,604,229 | * | 8/1986 | Raj et al. ............................. 277/410 |
| 4,673,997 | * | 6/1987 | Gowda et al. ........................ 277/410 |
| 4,797,013 | * | 1/1989 | Raj et al. ............................. 277/410 |
| 5,267,737 | * | 12/1993 | Cossette et al. ..................... 277/410 |
| 5,271,631 | * | 12/1993 | Yokouchi et al. .................... 277/410 |

FOREIGN PATENT DOCUMENTS 7-54153    6/1995 (JP) .

* cited by examiner

Primary Examiner—James R. Brittain
Assistant Examiner—John L. Beres
(74) Attorney, Agent, or Firm—Robert R. Deleault, Esq.; Mesmer & Deleault, PLLC

(57) ABSTRACT

A sealing apparatus which is disposed between the media side and the bearing side and adapted to hermetically seal members rotating concentrically relative to each other, wherein a passageway having in a U-shaped cross section is formed by an outer shielding member on the media side, an outer shielding member on the bearing side and an inner shielding member, the end portion of which is inserted into the cavity between the outer shielding members. The end portion of the inner shielding member has a T-shape or L-shape. A magnet is arranged at either the inner shielding member or the outer shielding member. A ferrofluid is retained in the cavity by the surrounding magnet. An oil repellent material may be coated on the surface of the inner shielding member except for a portion extending into the cavity and an adhered portion on its inner diameter side.

8 Claims, 5 Drawing Sheets

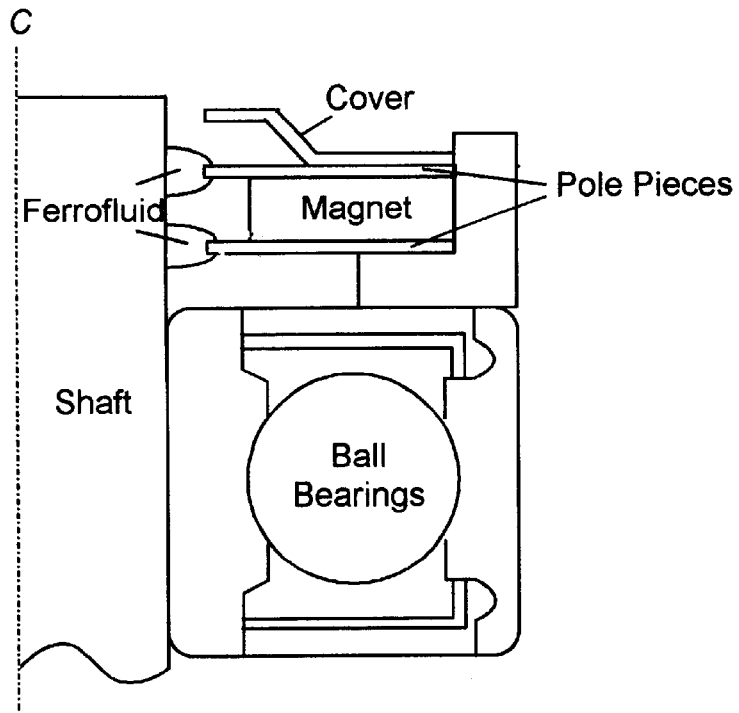
Fig. 1 *Prior Art*
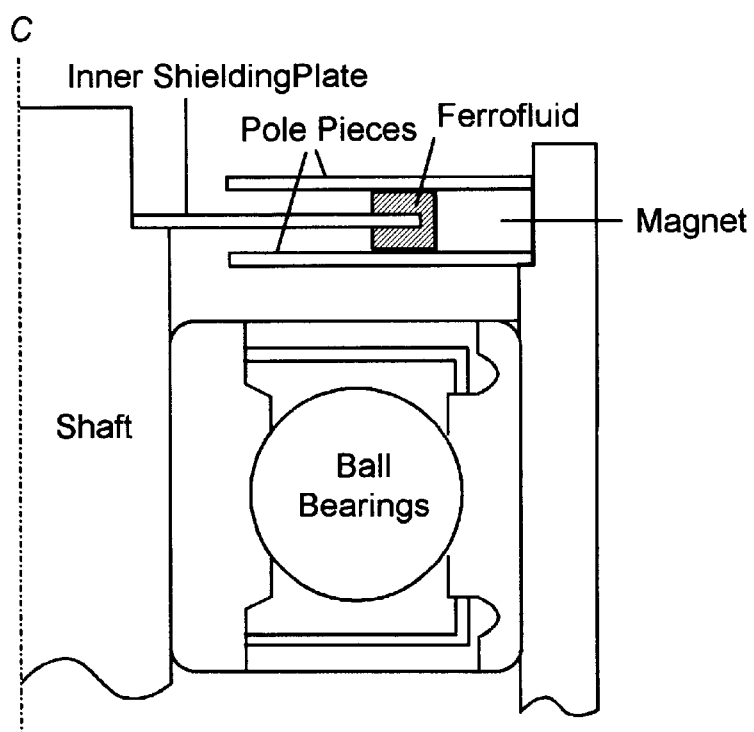
Fig. 2 *Prior Art*

SEALING APPARATUS

This application claims the benefit of Japanese Patent Application No. 11-15712, filed Jan. 25, 1999.

BACKGROUND OF THE INVENTION

1. Field of the Invention

The present invention relates to a sealing apparatus using a ferrofluid (a magnetic fluid). Particularly, the present invention relates to a sealing apparatus for a spindle motor requiring a hermetic seal between two environments where one environment needs to be free from contamination arising from the environment on the other side of the hermetic seal. More particularly, the present invention relates to a sealing apparatus for a spindle motor used in driving a magnetic recording medium in the information industry and other fields. Yet more particularly, the present invention relates to a sealing apparatus used in the information industry and other fields for sealing magnetic recording medium and a drive mechanism with a ferrofluid so as to prevent the magnetic recording medium from being adversely affected by dust or other contaminants in the drive mechanism.

2. Description of the Prior Art

Conventional centrifugal seals employ the principle of centrifugal effect at high speeds to retain a fluid for a sealing purpose. Such conventional centrifugal seals typically have a shaft supported by a cylindrical housing by way of a ball bearing and both are structured to become relatively rotatable at will. These conventional seals use a lubricating liquid, such as oil, to effect the seal when the rotating member has reached a high speed. Such conventional centrifugal seals of this type function satisfactorily in the high-speed mode, but, at lower shaft speeds, the seal fluid is not retained in place. One early, well-known form of a non-contacting seal for use at zero and low speeds is the magnetic ferrofluid seal. However, these early magnetic ferrofluid seals tend to break down and leak at high rotational speeds. An example of an early form of a ferrofluid seal is shown in FIG. 1. A shaft member is rotatably supported by ball bearings in a housing. A ring-like magnet is interposed between the media side (upper side of the drawing) and the side of the ball bearing. On both sides of the magnet, pole pieces having an inner diameter slightly larger than the diameter of the shaft member are installed forming gaps between the pole pieces and the shaft member. The gaps are filled with a ferrofluid. In such an arrangement, the ferrofluid is retained in the gaps by magnetic force of the ring-like magnet forming a hermetic seal at the gaps on both sides.

However, in this type of sealing configuration, the shaft member needs to be made of a magnetic material and needs to be polished to a mirror-like finish to prevent the ferrofluid from bleeding, i.e. the ferrofluid does not spread along the surface of the shaft member. In addition, when the shaft member starts rotating relative to the housing, centrifugal force is exerted on the ferrofluid. When the centrifugal force exceeds an allowable range, the hermetic seal is broken. Further, a cover is normally mounted to prevent the hand from touching the injected ferrofluid at the time of handling thereof and the apparatus is enlarged by an amount of the mounting space required by the cover.

Seals were later developed to overcome the deficiencies of the magnetic seal at high-speed operation and the centrifugal seal at low speed operation. There has been developed an apparatus in which a shaft-member shielding plate is installed between the pole pieces from the opposing side, as illustrated in Prior Art FIG. 2. The gap between the housing and the shaft member is made to detour in a U-shaped passageway. During high-speed operation, a centrifugal sealing mode is established. When the seal is rotating, the ferrofluid is transferred toward the side of the ring-like magnet by centrifugal force. As the operating speed decreases, the magnetic force lines caused by the ring-like magnet retain the ferrofluid thus effecting the magnetic seal mode.

U.S. Pat. No. 4,200,296 (1980, Stahl et al.) discloses a ferrofluid centrifugal seal and method of sealing a rotatable shaft. The ferrofluid is retained in an O-ring seal form at static and low speeds and is moved to a barrier seal in a passageway at high speeds.

FIGS. 1–4 of Japanese Patent Publication Tokukouhei 7-54153 (1995, Koyoseiko) discloses a ferrofluid centrifugal seal, more clearly shown in Prior Art FIG. 2 of the present invention. In this ferrofluid centrifugal seal, an inner side shielding plate is installed between pole pieces from the opposing side. The gap between the housing and the shaft member is made to detour in a U-shaped passageway, as described earlier.

However, the prior art suffers from various disadvantages. The prior art devices do not use conductive ferrofluids, thus are unable to dissipate the increased amounts of static charge developed at higher rotational speeds. The prior art devices cannot be shipped prefilled with ferrofluid because the small volume of ferrofluid and the free-floating nature of the inner shield cause ferrofluid leakage from the U-shaped detour passageway due to the ordinary jostling of the device during transportation. In addition, installing a prefilled prior art device is likely to cause leakage of the ferrofluid because the inner shield is free-floating. An installer needs to attach the inner shield to a shaft. During this process, it is very difficult to prevent the inner shield from moving up against one of the outer poles. This movement causes the ferrofluid to squirt out of the passageway. After installing the apparatus into an actual machine, it is a considerably involved operation to inject any replacement ferrofluid. Further, this makes it difficult to regulate the amount of the ferrofluid within the passageway. Another disadvantage is the fabrication problem of the prior art. In current prior art designs, the seal is shipped to a customer without ferrofluid. Because the inner diameters of the outer poles are relatively small compared to the outer diameter of the inner shield, the space available for injecting ferrofluid into the passageway is rather limited. Thus assembly of the device and injection of the ferrofluid is more difficult and time consuming.

Therefore what is needed is a sealing apparatus that uses a conductive ferrofluid which allows quick dissipation of greater amounts of static charge caused by higher rotational speeds. What is further needed is a sealing apparatus that can be shipped prefilled with ferrofluid without fear of ferrofluid leakage and assembled without ferrofluid squirting out of the sealing apparatus during the installation process. What is still further needed is a sealing apparatus that can operate for longer periods at higher rotational speeds than is currently practical. What is yet still further needed is a sealing apparatus in which the ferrofluid is easier to install. What is further needed is a sealing apparatus that is easier to fabricate.

SUMMARY OF THE INVENTION

The present invention provides a sealing apparatus that uses a conductive ferrofluid. The present invention further provides a sealing apparatus that is prefilled with ferrofluid before shipment to customers. The present invention still further provides a sealing apparatus that can operate for longer periods of time at higher rotational speeds than is presently available. The present invention yet further provides a sealing apparatus with a specially designed inner shielding member having a T-shaped or L-shaped end portion that prevents the ferrofluid from leaking out of the seal during shipment or during installation of the seal. The present invention still further provides a sealing apparatus that is easier to fabricate.

The present invention provides a sealing apparatus in which an end portion of an inner shielding member is inserted into a cavity formed by an outer shielding member on a media side (a first outer shielding member) and an outer shielding member on a bearing side (a second outer shielding member) to thereby form a U-shaped passageway. A magnet is arranged at either the inner shielding member or at one or both of the outer shielding members. A ferrofluid, preferably a conductive ferrofluid, is retained within the U-shaped passageway by the magnetic field established by the magnet. A magnetic field at the end portion of the inner shielding member can be intensified by constituting the end portion of the inner shielding member with a magnetic material and forming it into a T-like shape or an L-like shape, preferably a T-like shape. The intensified magnetic force further ensures retention of the ferrofluid.

The T-like shape is such that there is very small amount of clearance between the T-shaped end portion of the inner shielding member and the pair of outer shielding members during operation. The T-like shape allows prefilling of the sealing apparatus with ferrofluid. When a flat inner shielding member is used, accidental pushing of the inner shielding member against one of the outer shielding members causes the ferrofluid to squirt out of the U-shaped cavity. The T-like shape prevents pre-filled ferrofluid from squirting out of the U-shaped passageway during shipping, handling and installing of the sealing apparatus. The close tolerance between the T-shaped end portion and the outer shielding members allows little movement of the inner shielding member. This prevents the squirting effect from happening. Because of this problem in the prior art, prior art devices are not prefilled with ferrofluid.

The surface of the inner shielding member outside of the cavity may be coated with an oil repellent material such as Teflon or the like. The oil repellent material further aids in easily injecting the ferrofluid, which is generally an oil-based substance, into the U-shaped cavity. Because the oil repellent material reduces the wetting ability of the ferrofluid on the inner shielding member, the apparent surface tension of the ferrofluid in the cavity increases. This also helps to prevent ferrofluid leakage during shipment or installation of the present invention.

The magnetic force created by the magnet also helps in attracting any ferrofluid, which may remain on the oil repellent material during the ferrofluid injection process, toward the inner peripheral portion of the U-shaped cavity. In embodiments where a magnet is attached to the inner shielding member, the magnetic force also helps in attracting ferrofluid toward the peripheral portion of the inner shielding member. When the inner shielding member is formed in a T-like shape or in an L-like shape and such shape is magnetized, and by constituting either one of the outer shielding members with a magnetic material, a magnetic force field created between the inner shielding member and the outer shielding member enhances ferrofluid retention and enhances its ability to resist greater pressure differences between the media side and the bearing side.

Yet another advantage of the T-shaped and L-shaped inner shielding member is the ability to use much larger ferrofluid volumes, on the order of about 10 times more ferrofluid than is currently used, without losing ferrofluid by leakage during shipment and installation. In addition to preventing dust from entering the media side of the seal, the higher rotational speeds in the vicinity of approximately 15,000 rpm give rise to greater static electrical charge build up. Undissipated static electrical charge causes damage to data stored on the media and contributes to phenomenon known as a hard drive crash. The T-shape and L-shape is especially important for electrical conductivity. The T-shaped and L-shaped inner shielding member along with use of a conductive ferrofluid provides for a much higher electrical conductance of the seal, approximately 20 to 40 times higher than conventional seals. The higher electrical conductance of the present invention provides greater capacity to dissipate the increased static charge build up due to the higher rotational speeds. Thus, the present invention can be successfully used at higher rotational speeds, approximately 15,000 rpm There are various ways to form the ring-like magnet at the end portion of the inner shielding member. The inner shielding member may be constituted by a nonmagnetic material and the ring-like magnet may be fixed at the end portion. The inner shielding member may be constituted using a magnetic material with the end portion being formed in a T-like or L-like shape and magnetizing at least the T-shaped or L-shaped end portion to thereby constitute the magnet at the end portion.

In yet another embodiment of the present invention, the outer end portion of the outer shielding member on the bearing side may be bent in such a manner that the bent end portion covers the outer end of the outer shielding member on the media side as well as the magnet or the centerpiece which is arranged in the innermost portion of the cavity. In this particular embodiment, the above two outer shielding members are joined to each other at one place and the risk of ferrofluid leakage is further reduced. Further, in the case where the magnet is arranged in the innermost region of the cavity between the outer shielding members, the magnet is covered with the bent portion without requiring any further special coating therefor.

It is important to note that the any combination of material, i.e. nonmagnetic, magnetic and magnets, that makes up the major components of the present invention may be used to achieve one or more of the intended features previously discussed.

BRIEF DESCRIPTION OF THE DRAWINGS

FIG. 1 is an explanatory view of an example of a conventional sealing apparatus.

FIG. 2 is an explanatory view of an example of an improved conventional sealing apparatus.

DETAILED DESCRIPTION OF THE PREFERRED EMBODIMENT

Figure 3:
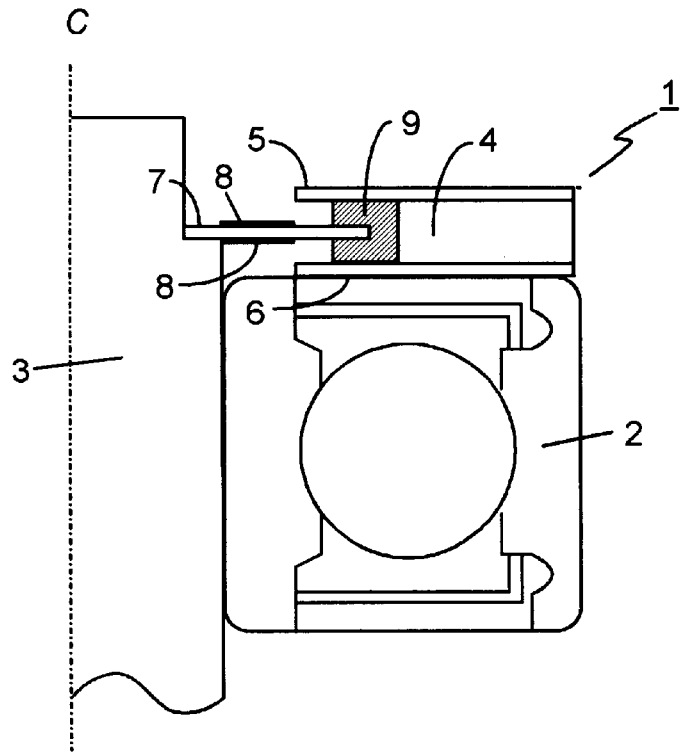
FIG. 3 is a cross-sectional view of one-half of the present invention mounted on a shaft member.

The preferred embodiment of the present invention is illustrated in FIGS. 3–9. FIG. 1 shows a basic illustration of an early form of a ferrofluid seal. A seal is rotatably supported by ball bearings in a housing. A ring-like magnet is interposed between the media side (upper side of the drawing) and the side of the ball bearing. On both sides of the magnet, pole pieces having an inner diameter slightly larger than the diameter of the shaft member are installed forming gaps between the pole pieces and the shaft. The gaps are filled with a ferrofluid. In such an arrangement, the ferrofluid is retained in the gaps by magnetic force of the ring-like magnet forming a hermetic seal at the gaps.

FIG. 2 shows an illustration of a current ferrofluid seal. This ferrofluid seal has an inner side shielding plate installed between the pole pieces from the opposing side. The gap between the housing and the shaft is made to detour in a U-shaped passageway. During high speed operation, a centrifugal sealing mode is established. When rotation occurs, the ferrofluid is transferred toward the side of the ring-like magnet by centrifugal force. As the operating speed decreases, the magnetic force lines caused by the ring-like magnet retain the ferrofluid thus effecting the magnetic seal mode. Both of these prior art devices have serious disadvantages over the present invention.

Embodiments of a sealing apparatus according to the present invention will now be discussed as applied to a spindle motor used in driving a magnetic recording medium. The sealing apparatus is used for maintaining a hermetic seal between a media side and bearing side having a shaft member, which is supported by a ball bearing in a housing.

Although, according to FIG. 3, rotational movement is carried out centering on a rotational center axis C, illustration of the left side portion is omitted. It should be understood by those skilled in the art that the present invention is not dependent on a rotating shaft. Either the shaft or the housing/ball bearing unit or both may rotate to provide the advantages taught in the disclosure of the present invention. FIG. 3 shows a sealing apparatus 1 connected to a shaft member 3 and supported by a ball bearing unit 2 so as to rotate relative thereto. Sealing apparatus 1 includes a first outer shielding member 5 on the media side, a second outer shielding member 6 on the bearing side and a ring-like magnet 4 sandwiched therebetween.

An inner shielding member 7 of sealing apparatus 1, which is also ring-like in appearance, is affixed to the shaft member 3 such that an end portion of inner shielding member 7 is within an inner portion of the annular cavity. Inner shielding member 7 may be secured to shaft member 3 by any means such as by threading or screws or with adhesive. For ease of manufacturing, a conductive adhesive is preferred. The size of inner shielding 7 is such that a front end of the end portion of inner shielding member 7 is within the annular cavity but is not brought into contact with the inner peripheral face of ring-like magnet 4. A coating 8, which includes an oil repellent material such as Teflon and the like, may be provided on both faces of the inner shielding member 7 except on portions within the cavity and the portion adhering to or affixed to shaft member 3. A ferrofluid 9 is retained at the innermost portion of the cavity, preferably ferrofluid 9 is a conductive ferrofluid. An example of a useable conductive ferrofluid is available from Ferrotec Corporation, Chiba, Japan, as conductive ferrofluid CFF200A. The use of a conductive ferrofluid increases the electrical conductivity of sealing apparatus 1, which allows for a greater capacity of the sealing apparatus 1 to dissipate static electric charge.

Figure 4:
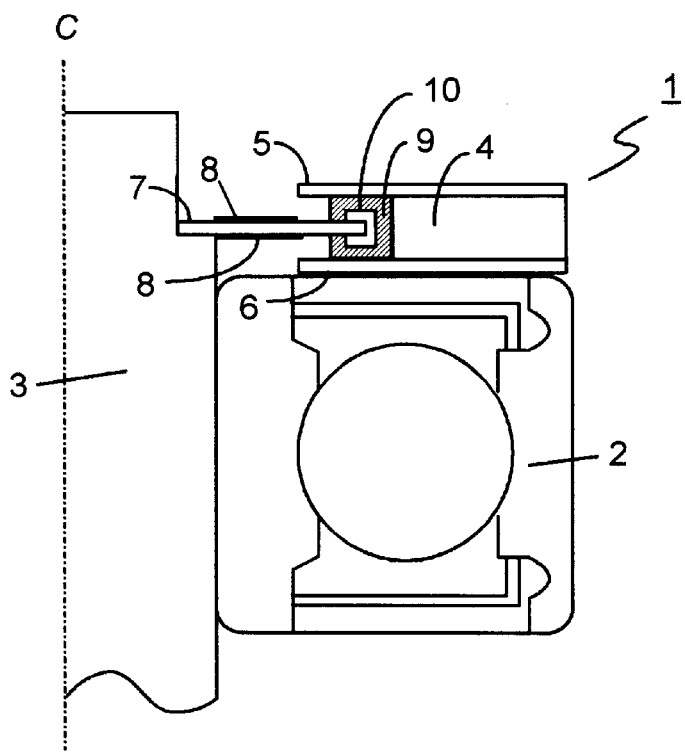
FIG. 4 is a cross-sectional view of one-half of the present invention showing a modified example of an inner shielding member having a T-shaped member.

FIG. 4 shows an example in which a magnetic member 10 having a U-shaped cross-section is mounted to the end portion of the inner shielding member 7 giving the end portion of inner shielding member 7 the appearance of a T-shape. Even though a T-shaped end portion is illustrated, it should be understood that an end portion which is wider than the remaining inner shielding member 7, whether T-shaped, L-shaped, bead-shaped, tear-drop shaped, and the like, will accomplish the enumerated advantages the present invention has over the prior art. The remaining components are the same as those illustrated in FIG. 3. By mounting the end portion of inner shielding member 7 with the magnetic member 10, a magnetic field at that end portion is intensified and retention of the ferrofluid 9 is further ensured. Magnetic member 10 may be secured to the end portion of the inner shielding member 7 by any appropriate means such as by adhesive bonding, laser welding, caulking without adhesion, or the like. Additionally, the protruding portion of the magnetic member 10 restricts the movement of inner shielding member 7 when shipping or installing sealing apparatus 1, thus preventing any ferrofluid 9 from squirting or leaking out of a pre-filled sealing apparatus 1.

Conventionally, the ferrofluid is injected in a predetermined portion after incorporating a conventional ferrofluid seal to an actual machine. This is an operation which is considerably involved and requires a number of steps in order to properly assemble the seal. On the other hand, installation of the sealing apparatus of the present invention in an actual machine is considerably facilitated because of the simplicity of the parts, their spatial relationship to each other and the preloading of ferrofluid in the cavity of the present invention. This, however, does not exclude injection of the ferrofluid after installation.

According to the invention, either one of the outer shielding members 5 and 6 can be constituted by a magnetic material and the other one can be constituted by a nonmagnetic material or vice versa. In such a configuration, the magnetic force within the annular cavity is enhanced and injection of the ferrofluid is facilitated. Further, the T-shaped or L-shaped end portion of inner shielding member 7 is in close proximity with either of the outer shielding members and the ferrofluid is prevented from leaking out by vibration or the like during shipping or installing operations of sealing apparatus 1.

Figure 5:
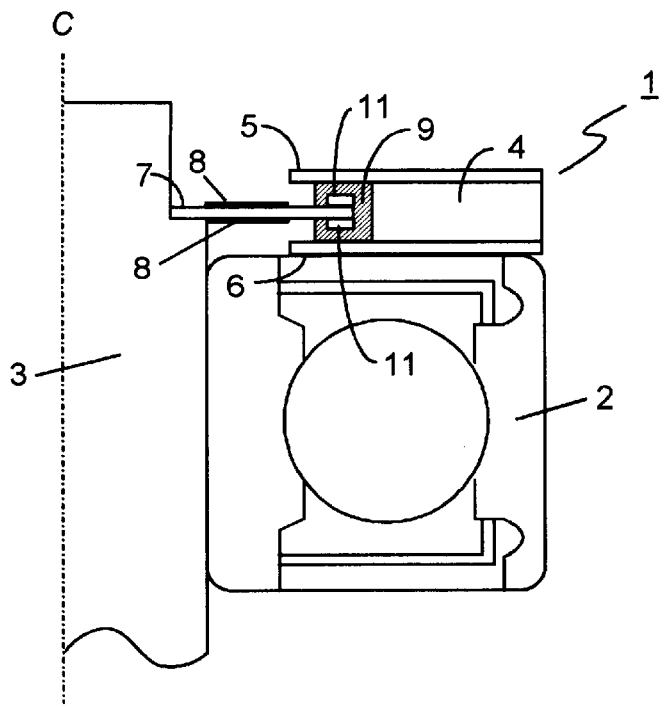
FIG. 5 is a cross-sectional view of one-half of the present invention showing a modified example of an inner shielding member with a modified T-shaped end portion.

FIG. 5 shows another configuration of the end portion of inner shielding member 7 in which magnetic members 11 are formed on both faces of the end portion of the inner shielding member 7. This configuration also gives the end portion of the inner shielding member 7 the appearance of a T-shape. Similar advantages are achieved by this configuration as those described and shown in FIG. 4.

Figure 6:
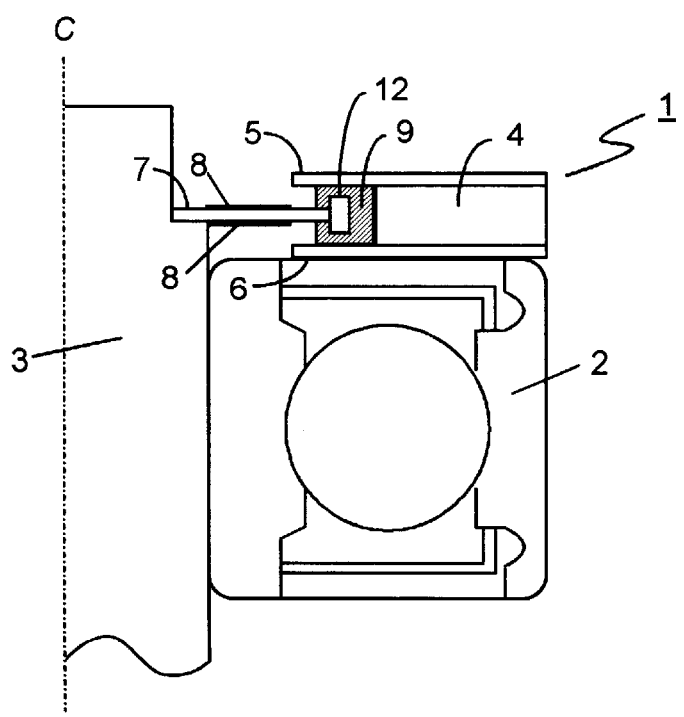
FIG. 6 is a cross-sectional view of one-half of the present invention showing a modified example of an inner shielding member having a magnetic member secured to the front end portion.

FIG. 6 shows an example in which a magnetic member 12 is secured to the front end portion of the inner shielding member 7. This configuration also gives the end portion of the inner shielding member 7 the appearance of a T-shape. This example also achieves advantages similar to those of the above-described two examples and illustrated in FIGS. 4 and 5.

Figure 7:
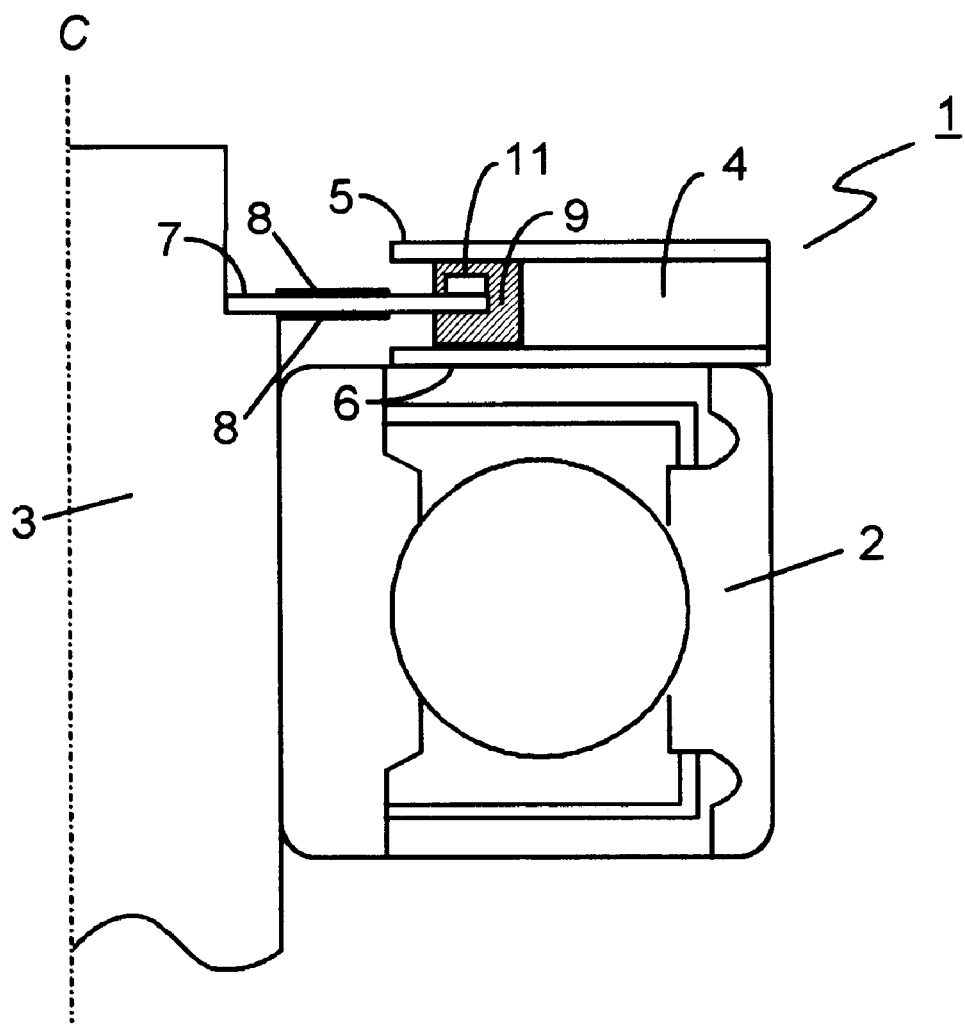
FIG. 7 is a cross-sectional view of one-half of the present invention showing a modified example of an inner shielding member having an L-shaped member.

FIG. 7 shows an example in which a magnetic member 11 is secured to one face of the end portion of the inner shielding member 7 opposite the first outer shielding member 5 giving the end portion of inner shielding member 7 the appearance of an L-shape. This configuration also provides some of the advantages over the prior art, similar to those of the T-shaped configuration previously described.

Figure 8:
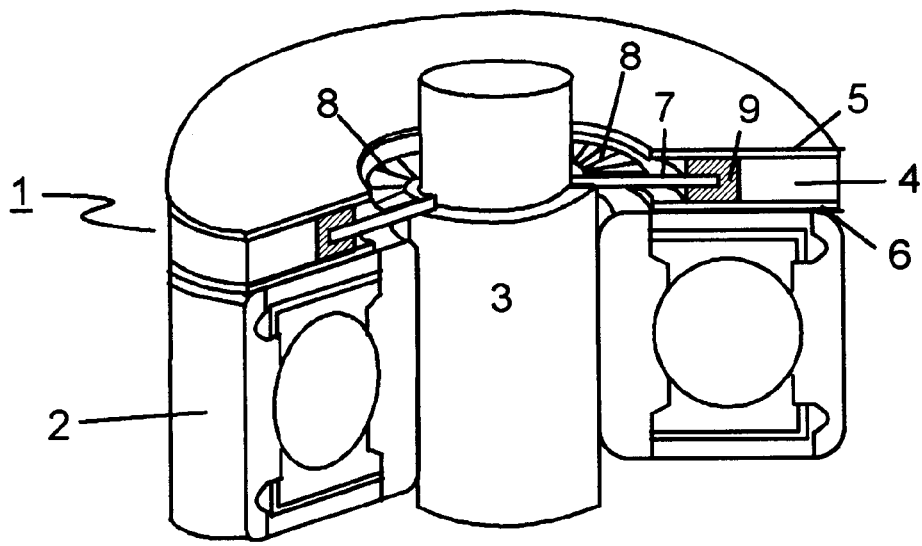
FIG. 8 is a perspective, cut-away view of one embodiment of the present invention showing a basic configuration mounted on a shaft member with ball bearings.
Figure 9:
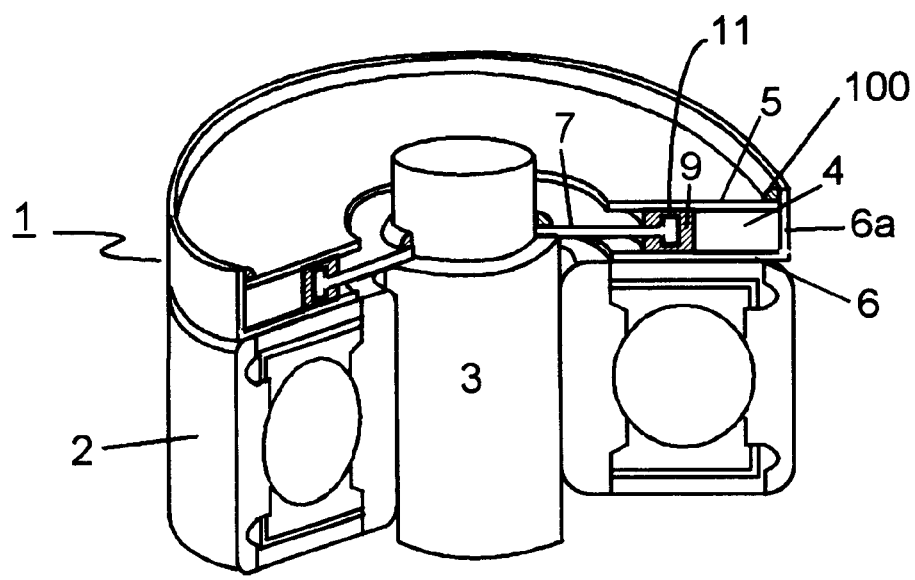
FIG. 9 is a perspective, cut-away view of another embodiment of the present invention showing an improved configuration having the bent end portion of the outer shielding member on the bearing side.

FIG. 8 shows a perspective, cut-away view of the basic components of sealing apparatus 1 attached to a shaft member 3 and bearing unit 2 of a spindle motor used in driving a magnetic recording medium. FIG. 9 shows a perspective, cut-away view of the basic components of sealing apparatus 1 where the second outer shielding member 6 is bent at its outer end portion so as to cover the magnet 4 and the outer end of the first outer shielding member 5, previously described.

Turning to the embodiment of the present invention illustrated in FIG. 8, the present invention is assembled as follows. An optional oil repellent 8 coating is applied to inner shielding member 7. First outer shielding member 5, ring-like magnet 4, inner shielding member 7, and second outer shielding member 6 are assembled in proper order. An adhesive resin is applied to both outer surfaces of magnet 4 and the corresponding mating surfaces of first outer shielding member 5 and second outer shielding member 6. A one component modified resin adhesive is preferred. One such resin is available from Mitsui Toatsu Chemical, Inc. (Strike Bond; cat. no. ES-5500FT). At this point, inner shielding member 7 is not fixed in position other than having the outer end portion of inner shielding member 7 extending into the annular cavity formed between first outer shielding member 5 and second outer shielding member 6. Ferrofluid 9 is injected into the annular cavity. Ferrofluid 9 is preferably a conductive ferrofluid. An acceptable conductive ferrofluid previously mentioned is available from Ferrotec Corporation, Chiba, Japan. Sealing apparatus 1 is then assembled to the spindle motor and a conductive adhesive is applied between the inner shielding member 7 and shaft member 3. The preferred conductive adhesive is a conductive silver epoxy adhesive available from various epoxy manufactures and suppliers.

Turning to the embodiment of the present invention illustrated in FIG. 9, an optional oil repellent coating 8 is applied to inner shielding member 7. Inner shielding member 7 has a T-shaped end portion, which will extend into the cavity formed by first outer shielding member 5, second outer shielding member 6 and ring-like magnet 4. Ring-like magnet 4, inner shielding member 7, and first outer shielding member 5 are assembled into second outer shielding member 6 which has bent end portion 6a. The bent outer end portion 6a of second outer shielding member 6 encloses the outer end portion of first outer shielding member 5 and the magnet 4, which is arranged in the innermost portion of the annular cavity. This design feature reduces the risk of ferrofluid leakage. Also, this variation allows one to exclude the use of any special coating covering the periphery of the magnet 4 when the magnet 4 is disposed in the innermost portion of the cavity.

A conductive adhesive 100, which is also a conductive silver epoxy adhesive, is applied between the outer end portion of first outer shielding member 5 and bent end portion 6a. Ferrofluid 9 is then injected into the annular cavity. Ferrofluid 9 is preferably a conductive ferrofluid. The T-shaped end portion 11 of inner shielding member 7 allows sealing apparatus 1 to be prefilled. The T-shaped end portion 11 prevents relatively large movements of inner shielding member 7 during shipment and installation, thus, greatly reducing the likelihood of ferrofluid 9 squirting out of the cavity. Sealing apparatus 1 is then assembled to the spindle motor and a conductive adhesive, as described above, is applied between the inner shielding member 7 and shaft member 3.

Although the preferred embodiments of the present invention have been described herein, the above descriptions are merely illustrative. Further modification of the invention herein disclosed will occur to those skilled in the respective arts and all such modifications are deemed to be within the scope of the invention as defined by the appended claims.

What is claimed is:

1. A sealing apparatus comprising:
    a pair of outer shielding members forming an annular cavity;
    an inner shielding member having an inner end portion and an outer end portion, said inner end portion adapted for connecting to a shaft, said outer end portion having a proximal portion and a distal portion, said distal portion being wider than said proximal portion, and wherein said outer end portion is inserted into said annular cavity formed by said pair of outer shielding members;
    a magnetic member arranged at one of said outer end portion of said inner shielding member and said pair of outer shielding members; and
    a ferrofluid disposed in said annular cavity.

2. The sealing apparatus of claim 1 wherein the cross-sectional shape of said outer end portion of said inner shielding member is one of T-shaped and L-shaped.

3. The sealing apparatus of claim 1 wherein said ferrofluid is conductive.

4. The sealing apparatus of claim 3 wherein said magnetic member having a ring-like shape is disposed between said first outer shielding member and said second outer shielding member and spaced from said first member inner diameter and said second member inner diameter.

5. The sealing apparatus of claim 1 further comprising an oil repellent coating on a predetermined portion of said inner shielding member.

6. The sealing apparatus of claim 3 further comprising an oil repellent coating on a predetermined portion of said inner shielding member.

7. A method of making a sealing apparatus for a rotary shaft, said method comprising:
    attaching a ring-like magnet having a magnet aperture with an inner magnet peripheral edge, a first magnet side and a second magnet side to a first outer shield plate having a first outer shield aperture smaller in diameter than said magnet aperture, said first outer shield plate being attached in concentric alignment to said first magnet side;
    positioning an inner shield member having an inside portion and an outside portion within said magnet aperture, said inside portion adapted for connecting to a shaft, said outside portion being wider than said inside portion, said inner shield member having an outside diameter smaller than said magnet aperture and larger than said first outer shield aperture;
    attaching a second outer shield to said second side of said magnet forming an annular space containing said outside portion of said inner shield member.

8. The method of claim 7 further comprising adding ferrofluid to said annular space.

* * * * *